United States Patent
Kwon et al.

(10) Patent No.: US 10,003,049 B2
(45) Date of Patent: Jun. 19, 2018

(54) SECONDARY BATTERY OF IMPROVED SAFETY

(75) Inventors: Sungjin Kwon, Daejeon (KR); Soonho Ahn, Seoul (KR); Hyun Chul Jung, Daejeon (KR); Ki Woong Kim, Daejeon (KR); Young Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 259 days.

(21) Appl. No.: 13/812,225

(22) PCT Filed: Aug. 2, 2011

(86) PCT No.: PCT/KR2011/005674
§ 371 (c)(1),
(2), (4) Date: Aug. 30, 2013

(87) PCT Pub. No.: WO2012/020939
PCT Pub. Date: Feb. 16, 2012

(65) Prior Publication Data
US 2013/0330606 A1    Dec. 12, 2013

(30) Foreign Application Priority Data
Aug. 9, 2010  (KR) .......... 10-2010-0076194

(51) Int. Cl.
*H01M 2/08* (2006.01)
*H01M 2/02* (2006.01)
(Continued)

(52) U.S. Cl.
CPC ......... *H01M 2/0202* (2013.01); *H01M 2/021* (2013.01); *H01M 2/08* (2013.01);
(Continued)

(58) Field of Classification Search
CPC .. H01M 2/021; H01M 2/0212; H01M 2/0585; H01M 2/0275; H01M 2/0202;
(Continued)

(56) References Cited

U.S. PATENT DOCUMENTS 6,428,934 B1 * 8/2002 Hatazawa ............ H01M 2/021
429/163
6,673,488 B2 * 1/2004 Furusaki ............. H01M 2/0212
429/163
(Continued)

FOREIGN PATENT DOCUMENTS

CN    101743654 A    6/2010
EP     1414084 B1    5/2007
(Continued)

OTHER PUBLICATIONS

International Search Report issued in PCT/KR2011/005674, dated Mar. 2, 2012.

*Primary Examiner* — Jimmy Vo
(74) *Attorney, Agent, or Firm* — Lerner, David, Littenberg, Krumholz & Mentlik, LLP

(57) ABSTRACT

Disclosed herein is a secondary battery having an electrode assembly mounted in a receiving part of a pouch-shaped battery case, wherein convex parts formed to protrude from the battery case upward are provided at the upper end of the receiving part of the battery case corresponding to electrode tabs of the electrode assembly so as to support coupling portions (V-form regions) between the electrode tabs and corresponding electrode leads against injection pressure of a holt melt resin during injection molding to form a pack case with respect to the secondary battery.

20 Claims, 8 Drawing Sheets

(51) Int. Cl.
  *H01M 2/22* (2006.01)
  *H01M 2/26* (2006.01)
  *H01M 10/04* (2006.01)
  *H01M 10/0525* (2010.01)

(52) U.S. Cl.
  CPC ............... *H01M 2/22* (2013.01); *H01M 2/26* (2013.01); *H01M 10/0436* (2013.01); *H01M 10/0525* (2013.01)

(58) Field of Classification Search
  CPC ............ H01M 2/08; H01M 2/22; H01M 2/26; H01M 10/0436; H01M 10/0525
  USPC ................ 429/162, 163, 175, 176, 179, 185
  See application file for complete search history.

(56) References Cited

U.S. PATENT DOCUMENTS

| | | | |
|---|---|---|---|
| 6,743,546 B1 * | 6/2004 | Kaneda | H01M 2/021 429/127 |
| 6,967,066 B2 * | 11/2005 | Kameyama et al. | 429/162 |
| 7,427,453 B2 | 9/2008 | Kim | |
| 7,498,099 B2 * | 3/2009 | Otohata et al. | 429/178 |
| 7,595,128 B2 | 9/2009 | Lee et al. | |
| 7,687,190 B2 | 3/2010 | Jang et al. | |
| 7,718,306 B2 | 5/2010 | Cheon et al. | |
| 8,202,647 B2 * | 6/2012 | Kodama et al. | 429/185 |
| 8,383,261 B2 * | 2/2013 | Mizuta et al. | 429/130 |
| 8,771,861 B2 * | 7/2014 | Ahn | 429/153 |
| 2003/0148174 A1 | 8/2003 | Gu | |
| 2004/0038122 A1 * | 2/2004 | Hisamitsu et al. | 429/120 |
| 2007/0202399 A1 * | 8/2007 | Shin et al. | 429/181 |
| 2009/0098416 A1 * | 4/2009 | Hatta et al. | 429/7 |
| 2009/0263712 A1 * | 10/2009 | Mizuta | H01M 2/021 429/177 |
| 2010/0173194 A1 | 7/2010 | Fujiya et al. | |

FOREIGN PATENT DOCUMENTS

| | | |
|---|---|---|
| JP | 2004-241328 A | 8/2004 |
| KR | 2001-0082058 A | 8/2001 |
| KR | 2001-0082059 A | 8/2001 |
| KR | 2001-0082060 A | 8/2001 |
| WO | WO 2009/013796 A1 | 1/2009 |

* cited by examiner

Prior Art

Prior Art

10

SECONDARY BATTERY OF IMPROVED SAFETY

TECHNICAL FIELD

The present invention relates to a secondary battery of improved safety, and, more particularly, to a secondary battery having an electrode assembly mounted in a receiving part of a pouch-shaped battery case, wherein convex parts formed to protrude from the battery case upward are provided at the upper end of the receiving part of the battery case corresponding to electrode tabs of the electrode assembly.

BACKGROUND ART

As mobile devices have been increasingly developed, and the demand for such mobile devices has increased, the demand for batteries has also sharply increased as an energy source for the mobile devices. Accordingly, much research into batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium ion batteries and lithium ion polymer batteries, exhibiting high energy density, discharge voltage and power stability, is very high.

Furthermore, secondary batteries may be classified based on the construction of an electrode assembly having a cathode/separator/anode structure. For example, the electrode assembly may be configured to have a jelly-roll (winding) type structure in which long-sheet type cathodes and anodes are wound while separators are disposed respectively between the cathodes and the anodes, a stacking type structure in which pluralities of cathodes and anodes having a predetermined size are sequentially stacked while separators are disposed respectively between the cathodes and the anodes, or a stacking/folding type structure in which pluralities of cathodes and anodes having a predetermined size are sequentially stacked while separators are disposed respectively between the cathodes and the anodes to constitute a bi-cell or a full-cell, and then bi-cells or the full-cells are wound using a separation film.

Recently, much interest has been taken in a pouch-shaped battery configured to have a structure in which such a stacking or stacking/folding type electrode assembly is mounted in a pouch-shaped battery case made of an aluminum laminate sheet because of low manufacturing costs, light weight and easy modification in shape. As a result, the use of pouch-shaped batteries has gradually increased.

FIG. 1 is an exploded perspective view typically illustrating the general structure of a conventional representative pouch-shaped secondary battery.

Referring to FIG. 1, a pouch-shaped battery cell 10 includes an electrode assembly 30, pluralities of electrode tabs 40 and 50 extending from the electrode assembly 30, electrode leads 60 and 70 welded to the electrode tabs 40 and 50, respectively, and a battery case 20 for receiving the electrode assembly 30.

The electrode assembly 30 is a power generating element including cathodes and anodes sequentially stacked while separators are disposed respectively between the cathodes and the anodes. The electrode assembly 30 is configured to have a stacking structure or a stacking/folding structure. The electrode tabs 40 and 50 extend from corresponding electrode plates of the electrode assembly 30. The electrode leads 60 and 70 are electrically connected to the electrode tabs 40 and 50, extending from the corresponding electrode plates of the electrode assembly 30, respectively, for example, by welding. The electrode leads 60 and 70 are partially exposed to the outside of the battery case 20. Also, insulative films 80 to improve sealability between the battery case 20 and the electrode leads 60 and 70 and, at the same time, to secure electrical insulation between the battery case 20 and the electrode leads 60 and 70 are partially attached to the upper and lower surfaces of the electrode leads 60 and 70.

The battery case 20 is made of an aluminum laminate sheet. The battery case 20 has a space defined therein to receive the electrode assembly 30. The battery case 20 is formed generally in the shape of a pouch. In the case that the electrode assembly 30 is a stacking type electrode assembly as shown in FIG. 1, the inner upper end of the battery case 20 is spaced a predetermined distance from the electrode assembly 30 such that the plurality of cathode tabs 40 and the plurality of anode tabs 50 can be coupled to the electrode leads 60 and 70, respectively.

FIG. 2 is a partially enlarged view illustrating the inner upper end of the battery case of the secondary battery shown in FIG. 1, in which the cathode tabs are coupled to each other in a concentrated state and connected to the cathode lead.

Referring to FIG. 2, the plurality of cathode tabs 40, which extend from cathodes 41 of the electrode assembly 30 in a protruding fashion, are connected to one end of the cathode lead 60, for example, in the form of a welded bunch configured by integrally combining the cathode tabs 40 with each other by welding. The cathode lead 60 is sealed by the battery case 20 while the other end 61 of the cathode lead 60, i.e. the end of the cathode lead 60 opposite to the end of the cathode lead 60 to which the welded bunch of the cathode tabs is connected, is exposed to the outside of the battery case 20. Since the plurality of cathode tabs 40 are integrally combined with each other to constitute the welded bunch, the inner upper end of the battery case 20 is spaced a predetermined distance from the upper end surface of the electrode assembly 30, and the cathode tabs 40 combined in the form of the welded bunch are bent approximately in a V shape. Accordingly, the coupling portions between the electrode tabs and the corresponding electrode leads may be referred to as V-form regions.

However, such V-form regions have a problem in terms of battery safety.

Specifically, when the battery drops with the upper end of the battery, i.e. the cathode lead 60 of the battery, facing down, or external physical force is applied to the upper end of the battery, the electrode assembly 30 moves toward the inner upper end of the battery case 20, or the upper end of the battery case 20 is crushed. As a result, anodes of the electrode assembly 30 are brought into contact with the cathode tabs 42 or the cathode lead 61, and therefore, a short circuit may occur inside the battery. Consequently, battery safety is greatly lowered.

Meanwhile, when a pack case of the secondary battery is formed by hot melt resin injection, the upper end of the battery case is pressurized with the result that the V-form region, i.e. the coupling portion between the cathode tabs and the cathode lead, is pushed, and therefore, the V-form region comes into contact with the anode. As a result, a short circuit occurs.

Consequently, there is a high necessity for technology that is capable of fundamentally solving such problems.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that, when, in a secondary battery having an electrode assembly mounted therein, convex parts formed to protrude from a battery case upward are provided at the upper end of a receiving part of the battery case corresponding to electrode tabs of the electrode assembly, it is possible to prevent the occurrence of a short circuit of the secondary battery although the electrode assembly moves due to dropping of the secondary battery or application of external force to the secondary battery, thereby further improving safety of the secondary battery. The present invention has been completed based on these findings.

Technical Solution

In accordance with one aspect of the present invention, the above and other objects can be accomplished by the provision of a secondary battery having an electrode assembly mounted in a receiving part of a pouch-shaped battery case, wherein convex parts formed to protrude from the battery case upward are provided at the upper end of the receiving part of the battery case corresponding to electrode tabs of the electrode assembly.

An internal short circuit of a battery due to dropping of the battery or application of external impact to the battery may act as a principal cause of explosion or combustion of the battery. This is because the electrode assembly moves, when the battery drops or the external impact is applied to the battery, with the result that cathodes and anodes of the electrode assembly are brought into contact with each other, and therefore, high resistance heat is generated due to conduction of current between such contact resistance portions. When the interior temperature of the battery exceeds a critical temperature level due to the resistance heat, the oxide structure of a cathode active material collapses, and therefore, a thermal runaway phenomenon occurs. As a result, the battery may catch fire or explode.

In the secondary battery according to the present invention, on the other hand, the convex parts formed to protrude from the battery case upward are provided at the upper end of the receiving part of the battery case corresponding to electrode tabs of the electrode assembly. Consequently, when the battery drops or external force is applied to the battery, the convex parts partially absorb impact. In addition, the convex parts provided a space upon movement of the electrode assembly to restrain contact between the cathodes and the anodes and thus to prevent an internal short circuit of the secondary battery, thereby improving safety of the secondary battery.

Also, in the secondary battery configured to have a structure in which the convex parts formed to protrude from the battery case upward are provided at the upper end of the receiving part of the battery case corresponding to electrode tabs of the electrode assembly as described above, a process of sorting defects of V-form regions is unnecessary, thereby greatly improving productivity.

In addition, the convex parts support coupling portions (V-form regions) between the electrode tabs and corresponding electrode leads against injection pressure of a hot melt resin during injection molding to form a pack case with respect to the secondary battery. Consequently, it is possible to effectively prevent the occurrence of a short circuit of the secondary battery due to contact between the V-form regions and the opposite electrodes thereof.

The electrode assembly is not particularly restricted so long as pluralities of electrode tabs are connected to each other to constitute cathodes and anodes. Preferably, the electrode assembly is configured to have a stacking structure and/or a stacking/folding structure. The details of an electrode assembly configured to have such a stacking/folding structure are disclosed in Korean Patent Application Publication No. 2001-0082058, No. 2001-0082059, and No. 2001-0082060, which have been filed in the name of the applicant of the present application. The disclosure of the above-mentioned patent publications is hereby incorporated by reference.

As defined above, the convex parts formed to protrude from the battery case upward are provided at the upper end of the receiving part of the battery case at positions corresponding to the electrode tabs. The convex parts may be formed at cathodes and anodes, respectively. Alternatively, the convex parts may be formed at the cathodes and the anodes so as to have an integrated structure over cathodes and anodes.

The size of the convex parts is not particularly restricted so long as the convex parts exhibit the aforementioned effects. In a preferred example, each of the convex parts may have a height equivalent to 1 to 30%, preferably 2 to 25%, more preferably 5 to 20%, of the thickness of the electrode assembly. Also, each of the convex parts may have a width equivalent to 80 to 300%, preferably 100 to 250%, more preferably 110 to 220%, of the width of the tabs of the electrode assembly.

The convex parts may be formed through a post-processing process after the electrode assembly is mounted in the receiving part and the battery case is sealed. Alternatively, the battery may be manufactured by placing the electrode assembly in the battery case at which the convex parts are already formed. In the former example, the post-processing process may be carried out manually or automatically.

According to circumstances, each of the convex parts may be filled with a shock-absorption member. Preferably, the shock-absorption member is made of a porous material.

In the secondary battery according to the present invention, the battery case may be made of a laminated sheet including a metal layer and a resin layer. Specifically, the battery case may be a pouch-shaped case, made of an aluminum laminate sheet, having a receiving part in which the electrode assembly is mounted. The battery case made of the laminated sheet is sealed, for example, by thermal welding after the electrode assembly is mounted in the receiving part of the battery case.

The secondary battery according to the present invention may be a lithium secondary battery. In particular, the secondary battery may be a lithium ion polymer battery configured so that an electrode assembly is impregnated with a gel type lithium-containing electrolyte.

Meanwhile, the convex parts may support coupling portions (V-form regions) between the electrode tabs and corresponding electrode leads against injection pressure of a holt melt resin during injection molding to form a pack case with respect to the secondary battery.

According to circumstances, the convex parts may extend to the electrode assembly, to the coupling portions between the electrode tabs and the electrode leads and to a region at which insulative films are attached to the battery case stepwise.

Consequently, the convex parts with the above-stated construction prevent insulation breakdown caused by not considering the thickness of the relatively thick region due to the connection between the region of the electrode assembly, the electrode tabs and the electrode leads during forming the conventional pouch-shaped battery case.

In the above structure, the region at which the insulative films are attached to the battery case may be a region at which the electrode leads are not exposed to the outside.

Consequently, the battery case is formed stepwise to the region at which the electrode leads are not exposed to the outside, i.e. to the region at which the insulative films are attached to the battery case, thereby solving a wrinkle-related problem caused during pouch sealing although the electrode leads are thick enough to secure high capacity and high power.

Effects of the Invention

As is apparent from the above description, in the secondary battery according to the present invention, the convex parts formed to protrude from the battery case upward are provided at the upper end of the receiving part of the battery case corresponding to the electrode tabs of the electrode assembly. During injection molding to form the pack case with respect to the secondary battery, therefore, the coupling portions (V-form regions) between the electrode tabs and the electrode leads are supported against injection pressure of a hot melt resin. Consequently, it is possible to effectively prevent the occurrence of a short circuit of the secondary battery due to contact between the V-form regions and the opposite electrodes thereof. In addition, it is possible to prevent the occurrence of a short circuit of the secondary battery although the electrode assembly moves due to dropping of the secondary battery or application of external force to the secondary battery, thereby further improving safety of the secondary battery.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
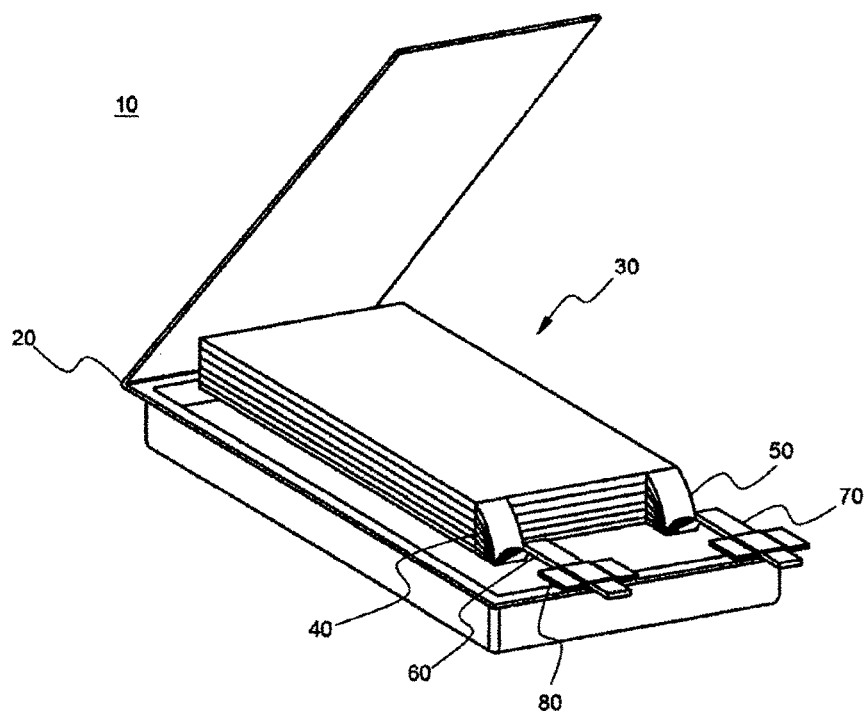
FIG. 1 is an exploded perspective view typically illustrating the general structure of a conventional representative pouch-shaped secondary battery.
Figure 2:
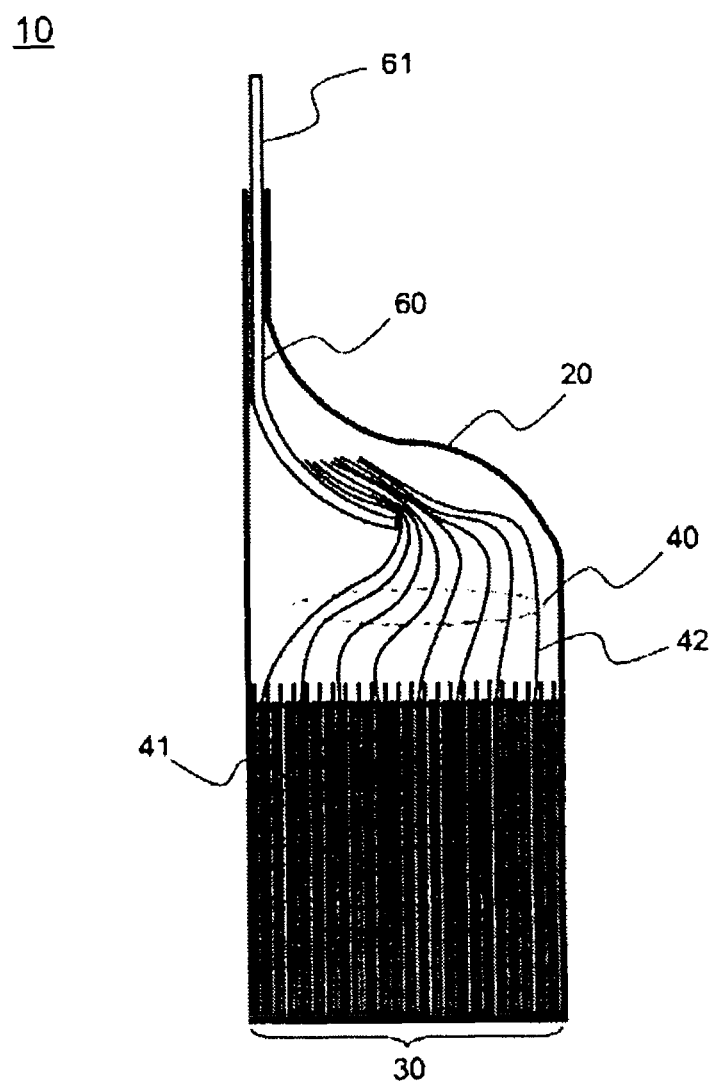
FIG. 2 is a partially enlarged view illustrating the inner upper end of a battery case of the secondary battery shown in FIG. 1, in which cathode tabs are coupled to each other in a concentrated state and connected to a cathode lead.
Figure 3:
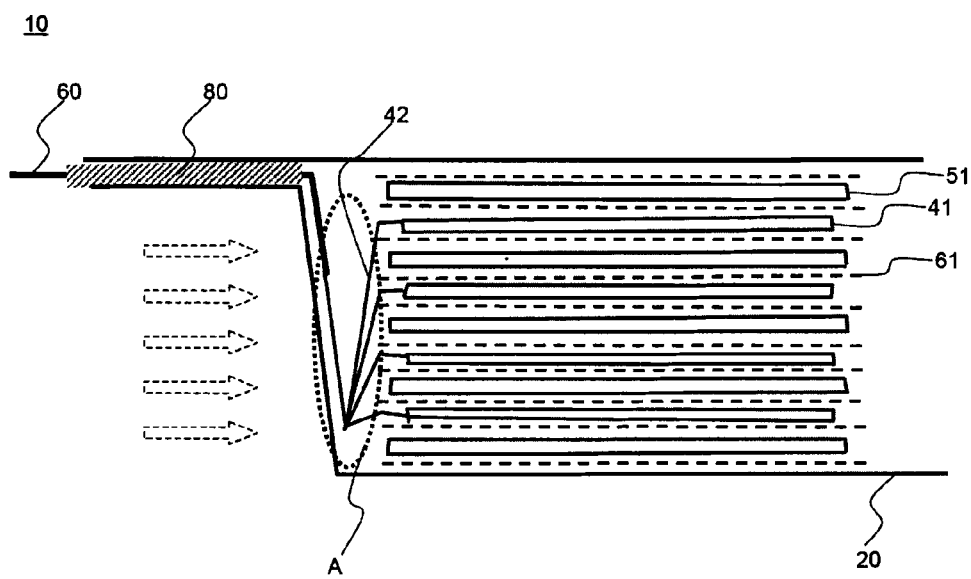
FIG. 3 is a typical view illustrating injection pressure of a hot melt resin applied to a coupling portion between electrode tabs and an electrode lead.
Figure 4:
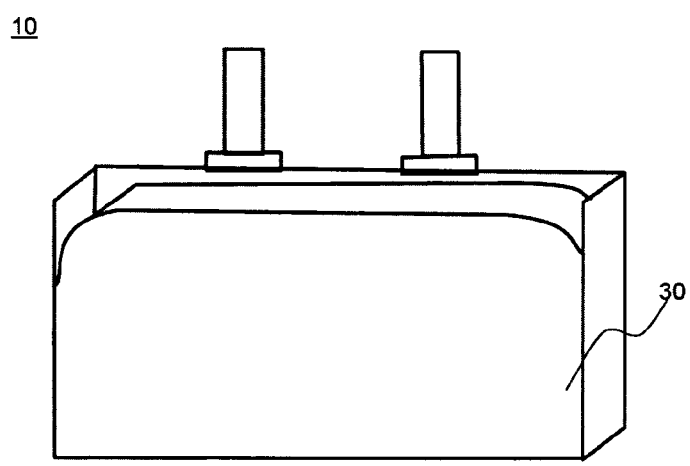
FIG. 4 is a partial perspective view illustrating the upper part of a secondary battery.

FIG. 3 is a typical view illustrating injection pressure of a hot melt resin applied to a coupling portion between electrode tabs and an electrode lead, and FIG. 4 is a partial perspective view typically illustrating the upper part of a secondary battery.

Referring to these drawings, when a battery pack is formed by hot melt resin injection, the upper end of a battery case 20 of a battery cell 10 is pressurized by the hot melt resin in the direction indicated by arrows with the result that a V-form region A of cathode tab 42 is pressed, and therefore, the V-form region A comes into contact with anodes 51. As a result, a short circuit occurs and heat is generated. Hot melt resin injection is a method of integrally forming a pack case, in which the battery cell will be mounted, at the outside of the battery cell using a hot melt resin.

Figure 5:
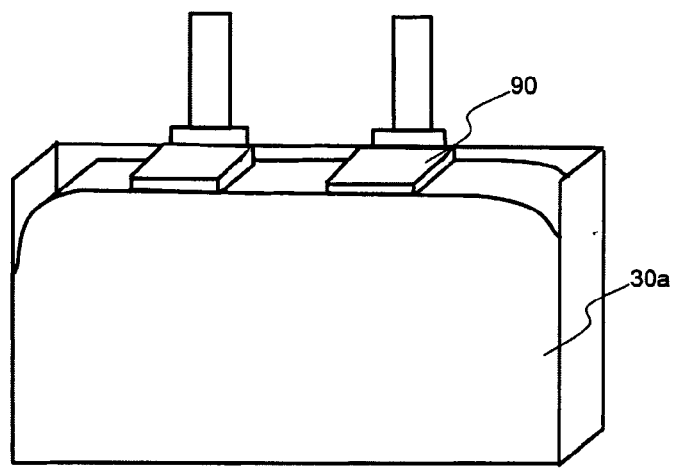
FIG. 5 is a partial perspective view illustrating a structure in which convex parts are formed at the upper end of a receiving part of a battery case according to an embodiment of the present invention.
Figure 6:
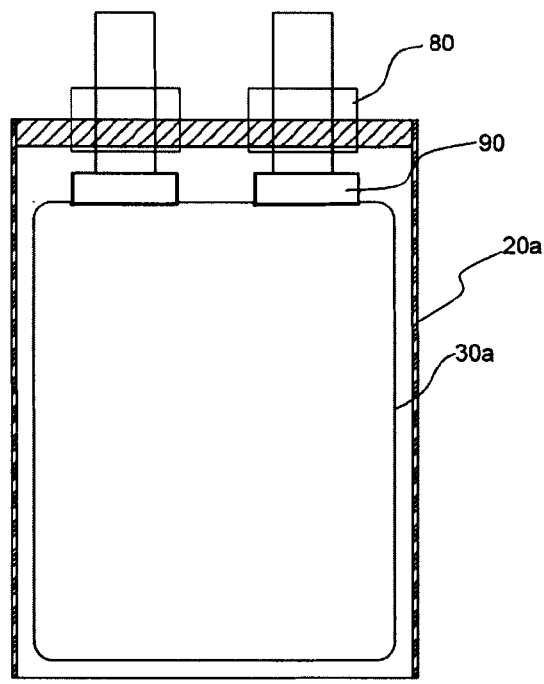
FIG. 6 is a front view typically illustrating the secondary battery of FIG. 5.

FIG. 5 is a partial perspective view typically illustrating a structure in which convex parts are formed at the upper end of a receiving part of a battery case according to an embodiment of the present invention, and FIG. 6 is a front view typically illustrating the secondary battery of FIG. 5.

Referring to these drawings, a secondary battery 10a has an electrode assembly 30a mounted in a receiving part of a pouch-shaped battery case 20a.

Also, convex parts 90 formed to protrude from the battery case 20a upward are provided at the upper end of the receiving part of the battery case 20a corresponding to electrode tabs of the electrode assembly 30a. During injection molding to form a pack case with respect to a battery cell, therefore, coupling portions between the electrode tabs and corresponding electrode leads, i.e. V-form regions, are supported against injection pressure of a hot melt resin.

Figure 7:
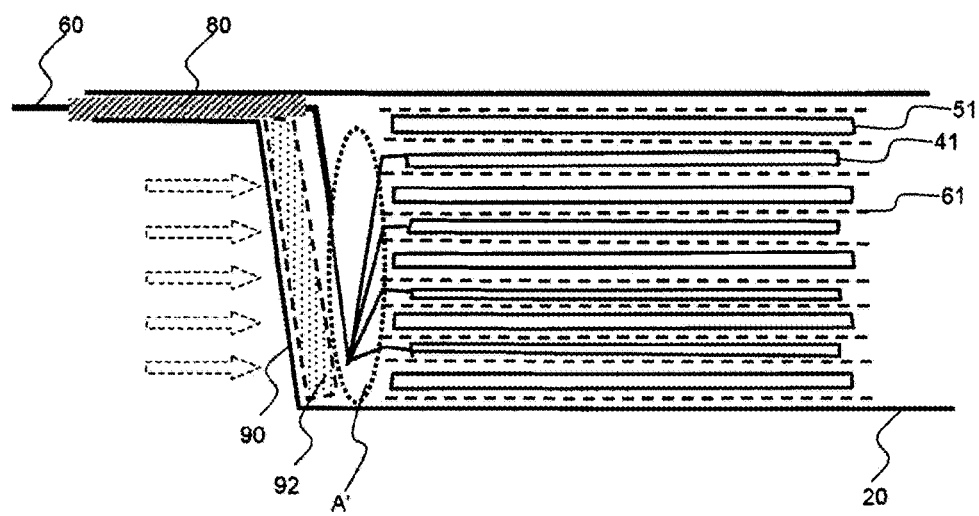
FIG. 7 is a typical view illustrating injection pressure of a hot melt resin applied to a coupling portion between electrode tabs and an electrode lead in the secondary battery of FIG. 5.

FIG. 7 is a typical view illustrating injection pressure of the hot melt resin applied to the coupling portion between the electrode tabs and the corresponding electrode lead in the secondary battery of FIG. 5.

Referring to FIG. 7, each of the convex parts 90 is filled with a shock-absorption member 92 made of a porous material.

When the injection pressure of the hot melt resin is applied to the upper end of the battery case 20 in the direction indicated by arrows, therefore, the convex parts 90 absorb shock to prevent cathode tabs and anodes from coming into contact with each other at the coupling portion A' between the electrode tabs and the corresponding electrode lead and thus preventing the occurrence of a short circuit.

Figure 8:
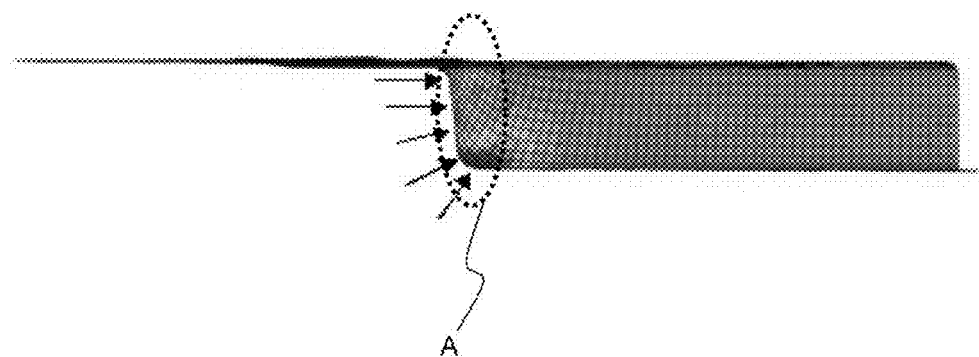
FIGS. 8 and 9 are photographs illustrating deformation of a tab region due to injection pressure in the secondary battery of FIG. 4.
Figure 9:
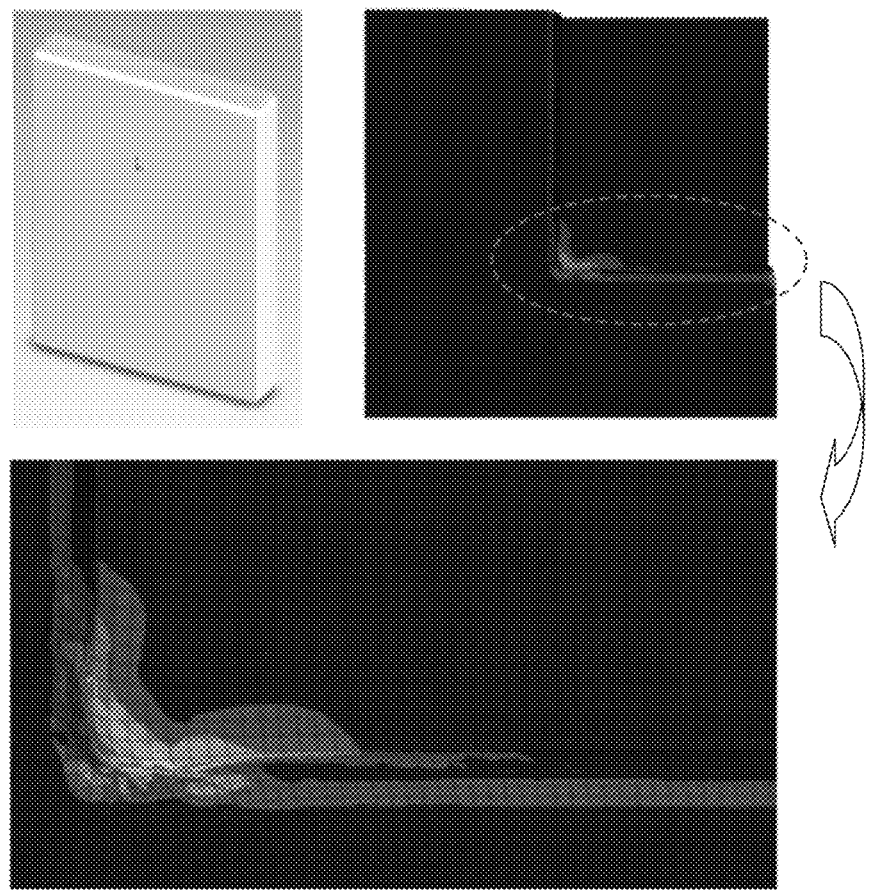
Figure 10:
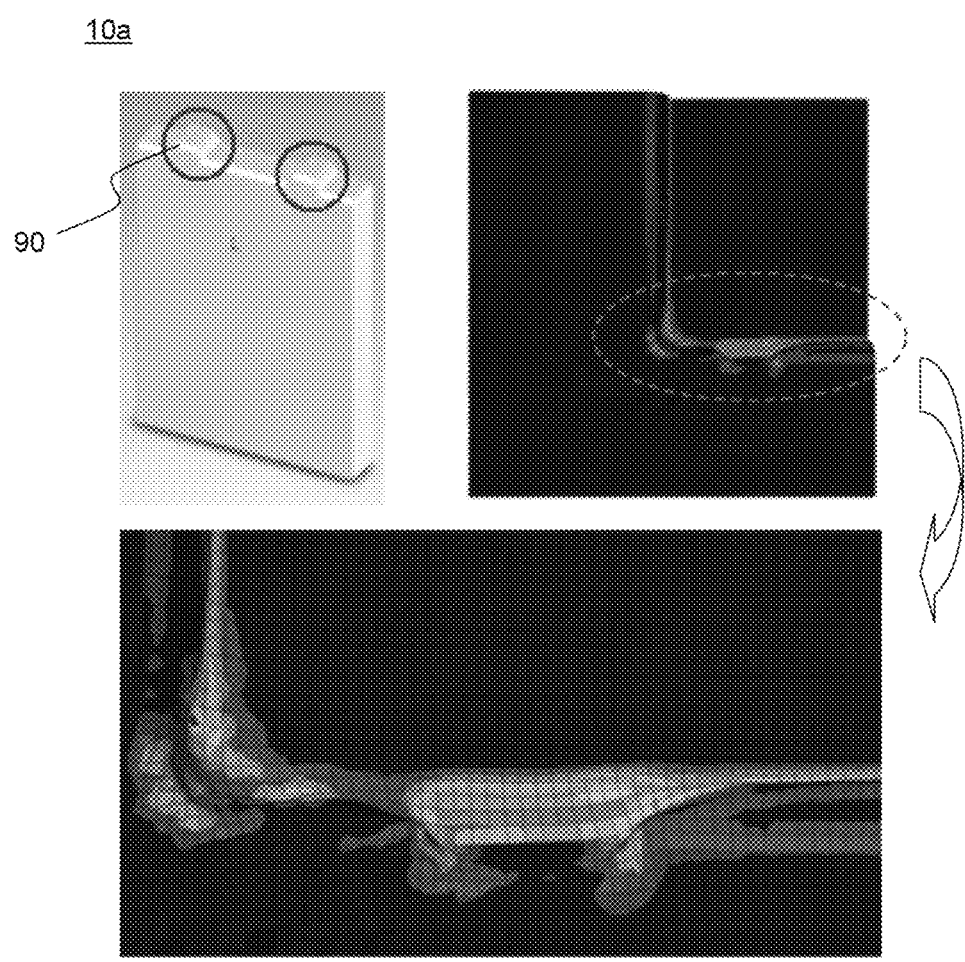
FIG. 10 is photographs illustrating deformation of a tab region due to injection pressure in the secondary battery of FIG. 5.

FIGS. 8 and 9 are photographs illustrating deformation of a tab region due to injection pressure in the secondary battery of FIG. 4, and FIG. 10 is photographs illustrating deformation of a tab region due to injection pressure in the secondary battery of FIG. 5.

Referring first to a battery cell 10 shown in FIGS. 8 and 9, it can be seen that the injection pressure of the hot melt resin is concentrated on the coupling portion between the electrode tabs and the corresponding electrode lead, i.e. the V-form region A.

For a battery cell 10a of FIG. 10 in which the convex parts are formed at the upper end of the receiving part of the battery case, on the other hand, the injection pressure of the hot melt resin is dispersed throughout the convex parts 90. Consequently, it can be seen that the injection pressure of the hot melt resin applied to the coupling portion between the electrode tabs and the corresponding electrode lead, i.e. the V-form region, is lower than in the battery cell 10 of FIG. 9.

Figure 11:
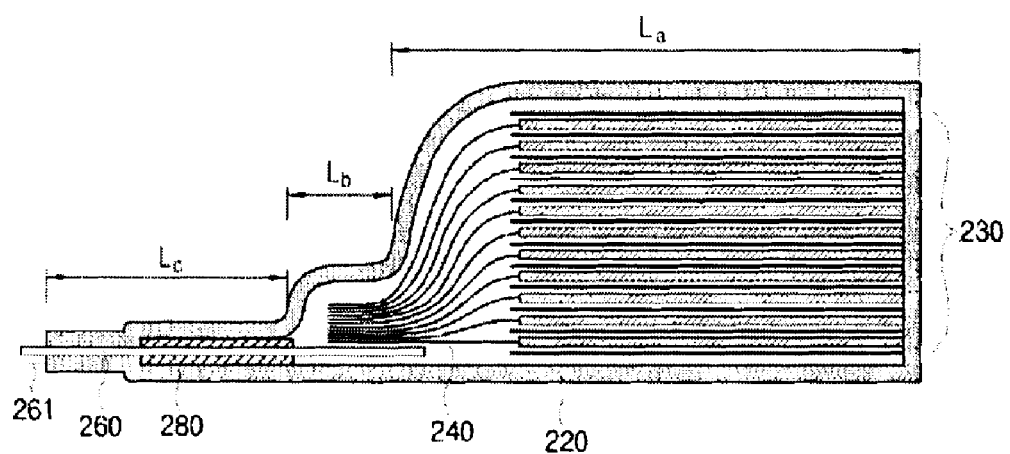
FIG. 11 is a partial typical view of a secondary battery illustrating a pouch form according to another embodiment of the present invention.

FIG. 11 is a partial typical view of a secondary battery illustrating a pouch form according to another embodiment of the present invention.

Referring to FIG. 11, a pouch-shaped secondary battery includes an electrode assembly in which cathodes and anodes are formed while the cathodes and the anodes are insulated by separators, electrode tabs 240 extending from the electrode assembly 230, electrode leads 260 welded to the electrode tabs 240, and a pouch-shaped battery case 220 to receive the electrode assembly 230.

The electrode assembly 230 is a power generating element including cathodes and anodes sequentially stacked while separators are disposed respectively between the cathodes and the anodes. The electrode assembly 230 is configured to have a stacking structure or a stacking/folding structure.

The electrode tabs 240 extend from electrode plates of the electrode assembly. The electrode leads 260 are electrically connected to pluralities of electrode tabs (cathode tabs and anode tabs) extending from the respective electrode plates. Portions 261 of the electrode leads 260 are exposed to the outside of the battery case.

Also, insulative films 280 are attached to the upper and lower surfaces of the electrode leads 260 to prevent the occurrence of a short circuit between a thermal welding device and the electrode leads 260 and to secure sealability between the electrode leads 260 and the battery case 220 when upper end sealing portions of the pouch-shaped battery case 220 are thermally welded by the thermal welding device.

In addition, the pouch form extends to a region La at which the electrode assembly 230 is located, a welded region Lb at which the electrode tabs 240 extending from the electrode assembly are connected to the corresponding electrode leads 260 and a region Lc at which the insulative films 280 are attached to the pouch-shaped battery case. The pouch form is configured stepwise in consideration of the difference in thickness between the regions.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery comprising:
a pouch-shaped battery case having a bottom wall and a sidewall extending upwardly from the bottom wall, the battery case forming a receiving part;
a lid attached to an upper edge of the sidewall;
an electrode assembly in the receiving part;
first and second sets of electrode tabs extending from the electrode assembly;
first and second convex parts formed to protrude outwardly from the sidewall of the battery case, the first and second convex parts each having a front wall, wherein the first and second convex parts are spaced apart from one another along the sidewall of the battery case, the first and second convex parts being spaced apart from one another in a direction parallel to the bottom wall of the battery case; and
first and second shock-absorption members filling the respective first and second convex parts, the first and second shock-absorption members being contained only in the respective first and second convex parts such that the first and second shock-absorption members are spaced apart from one another in the direction parallel to the bottom wall of the battery case, each of the first and second shock-absorption members having a first surface contacting and parallel to the front wall of the respective first and second convex part, and each of the first and second shock-absorption members having a second surface opposite the first surface, the second surfaces facing the respective first and second sets of electrode tabs,
wherein the first and second sets of electrode tabs are spaced from the respective first and second shock-absorption members and the sidewall, such that the first and second sets of electrode tabs contact neither the respective first and second shock-absorption members nor the sidewall at any point along the electrode tabs.

2. The secondary battery according to claim 1, wherein the electrode assembly is configured to have a stacking structure or a folding structure.

3. The secondary battery according to claim 1, wherein the first and second convex parts are formed at an upper end of the receiving part of the battery case at positions corresponding to the first and second sets of electrode tabs.

4. The secondary battery according to claim 1, wherein the first and second convex parts are formed at an upper end of the receiving part of the battery case at positions corresponding to the first and second sets of electrode tabs so as to have an integrated structure over cathodes and anodes.

5. The secondary battery according to claim 1, wherein each of the first and second convex parts has a height equivalent to 1 to 30% of the thickness of the electrode assembly.

6. The secondary battery according to claim 1, wherein each of the first and second convex parts has a width equivalent to 80 to 300% of the width of the electrode tabs of the electrode assembly.

7. The secondary battery according to claim 1, wherein the first and second convex parts are formed through a post-processing process after the electrode assembly is mounted in the receiving part and the battery case is sealed.

8. The secondary battery according to claim 1, wherein the battery is manufactured by placing the electrode assembly in the battery case at which the first and second convex parts are already formed.

9. The secondary battery according to claim 1, wherein the battery case is made of a laminated sheet comprising a metal layer and a resin layer and is sealed by thermal welding after the electrode assembly is mounted in the receiving part.

10. The secondary battery according to claim 9, wherein the sheet is an aluminum laminate sheet.

11. The secondary battery according to claim 1, wherein the battery is a lithium ion polymer battery.

12. The secondary battery according to claim 1, wherein the first and second convex parts support coupling portions having V-form regions between the first and second sets of electrode tabs and corresponding electrode leads against injection pressure of a hot melt resin during injection molding to form a pack case with respect to the secondary battery.

13. The secondary battery according to claim 1, wherein the electrode assembly has a front edge spaced from a front wall of the battery case,
   wherein the first and second sets of electrode tabs extend from the front edge of the electrode assembly, and
   wherein the first and second sets of electrode tabs are within a space between the front edge of the electrode assembly and the respective first and second shock-absorption members.

14. The secondary battery of claim 13, further comprising first and second electrode leads extending into respective first and second spaces defined between the front edge of the electrode assembly and the respective first and second shock-absorption member, the first and second electrode leads connected to the respective first and second sets of electrode tabs.

15. The secondary battery of claim 13, wherein the first set of electrode tabs comprises a plurality of first electrode tabs joined to one another, and the second set of electrode tabs comprises a plurality of second electrode tabs joined to one another, the joined electrode tabs of each of the first and second sets of electrode tabs forming a V-shape.

16. The secondary battery according to claim 1, wherein the first and second shock-absorption members are made of a porous material.

17. A secondary battery, comprising:
   a pouch-shaped battery case, the battery case having a bottom wall and a front wall;
   a lid attached to an upper edge of the front wall;
   an electrode assembly mounted in the battery case, the electrode assembly having a front edge spaced from the front wall of the battery case;
   electrode tabs extending from the front edge of the electrode assembly and connected to an electrode lead extending out of the battery case;
   first and second convex portions formed in the front wall of the battery case and protruding outwardly therefrom, wherein the first and second convex portions are spaced apart from one another along the front wall of the battery case, the first and second convex portions being spaced apart from one another in a direction parallel to the bottom wall of the battery case; and
   a shock absorbing member in each of the first and second convex portions, the shock absorbing member having a first surface forming a first exterior surface of the shock absorbing member contacting and parallel to the front wall and a second surface opposite the first surface, the second surface forming a second exterior surface of the shock absorbing member and facing the electrode tabs, the shock absorbing member being below the upper edge of the front wall,
   wherein the electrode tabs are spaced from the front wall within a space between the front edge of the electrode assembly and the second surface of the shock absorbing member, such that the electrode tabs contact neither the shock absorbing member nor the front wall at any point along the electrode tabs.

18. The secondary battery according to claim 17, wherein the electrode lead extends from the upper edge of the front wall downwardly toward the bottom wall, and wherein the electrode lead connects to the electrode tabs in the space between the front edge of the electrode assembly and the second surface of the shock absorbing member.

19. A secondary battery, comprising:
   a pouch-shaped battery case, the battery case having a bottom wall and a front wall;
   a lid attached to an upper edge of the front wall;
   an electrode assembly mounted in the pouch-shaped battery case, the electrode assembly having a front edge spaced from the front wall of the battery case;
   electrode tabs extending from the front edge of the electrode assembly and connected to an electrode lead extending out of the battery case, the electrode tabs being within a first area of the case spaced from the front wall;
   first and second convex portions formed in the front wall of the battery case and protruding outwardly therefrom, wherein the first and second convex portions are spaced apart from one another along the front wall of the battery case, the first and second convex portions being spaced apart from one another in a direction parallel to the bottom wall of the battery case; and
   a shock absorbing member in each of the first and second convex portions, the shock absorbing member having a first surface forming a first exterior surface of the shock absorbing member, the first surface contacting and parallel to the front wall of the battery case and a second surface opposite the first surface and facing the electrode tabs, the shock absorbing member being within a second area of the battery case, the second area being between the first area and the front wall of the battery,
   wherein the shock absorbing member does not extend into the first area and the electrode tabs do not extend into the second area, such that the electrode tabs contact neither the shock absorbing member nor the front wall at any point along the electrode tabs.

20. The secondary battery according to claim 19, wherein the electrode lead extends from the upper edge of the front wall downwardly toward the bottom wall, and wherein the electrode lead connects to the electrode tabs in the first area.

* * * * *